UNITED STATES PATENT OFFICE.

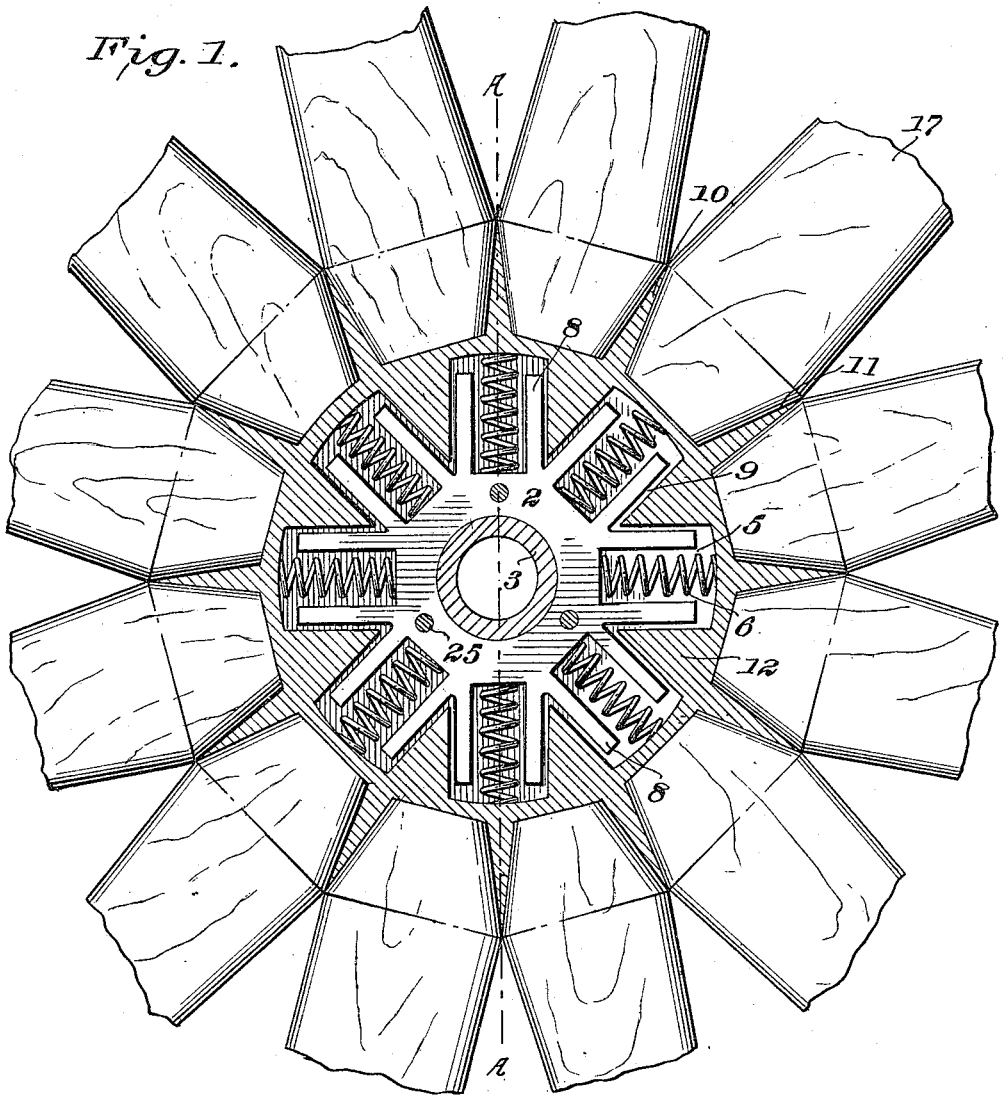

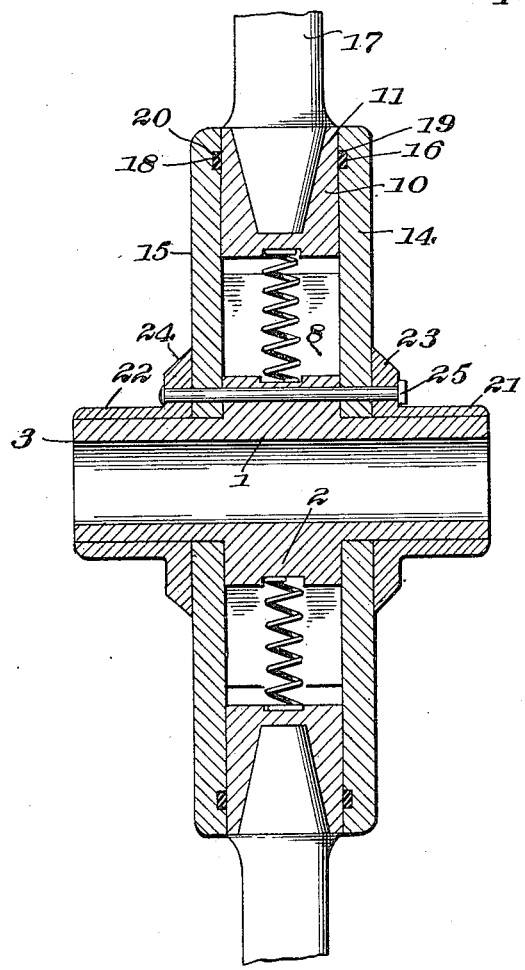

JOHN BERNER, OF WHITEFIELD, MARSHALL COUNTY, ILLINOIS.

SPRING-HUB.

994,111. Specification of Letters Patent. Patented June 6, 1911.

Application filed November 30, 1909. Serial No. 530,662.

*To all whom it may concern:*

Be it known that I, JOHN BERNER, a citizen of the United States, and a resident of the town of Whitefield, county of Marshall, State of Illinois, have invented certain new and useful Improvements in Spring-Hubs, of which the following is a specification.

This invention relates broadly to resilient wheels and specifically to spring hub wheels.

The object of the invention is to provide a strong hub, constructed in such manner as to give sufficient resilience to take up vibration due to rough roads, etc.

Another object of the invention is to provide a resilient wheel having a spring hub so arranged that the retaining means on the movably mounted member shall be so arranged as to be effective to keep the two parts in relationship with a minimum rotative action between said parts.

A still further object of the invention is to provide a resilient wheel with a spring hub which is simple in its construction and very strong when assembled.

A still further object of the invention is to provide a resilient wheel with a spring hub, the parts of which are arranged in such manner as to prevent water entering into the working parts of the hub.

Other and further objects of the invention will be brought out in the specification and the claim annexed thereto, and will be disclosed in the drawings, in which like numerals indicate like parts throughout the several figures.

Figure 1 is an elevation of the resilient hub showing one side plate removed. Fig. 2 is a vertical section taken on line A—A of Fig. 1.

Referring more particularly to Fig. 2 of the drawings, the hub member 1 is constructed with a central prismoidal portion 2 and cylindrical side portions 3, 3. The prismoidal portion 2 is formed with a number of radially extending side plates 8, between each of which is a slot as at 5, adapted to form retaining openings in which resilient springs 6 may be housed. Side plates 8 are arranged to axially aline with tangent planes drawn to a circle circumscribing the axis of the hub member 1, thus leaving a V-shaped opening 9 between the housings of the resilient springs 6. An outer member 10 is arranged with spoke openings 11 in its periphery, which are adapted to form seats for spokes 17 of a wheel. The member 10 is arranged with inwardly extending wedged-shaped portions 12, which are adapted to operate within the V-shaped openings 9 in the central star-shaped portions 2 of the hub 1. The resilient springs 6 are adapted to contact with the outer member 11 midway between each of the wedged-shaped portions 12. Side plates 14 and 15 are carried upon the cylindrical side portions 3, 3 of the hub 1, and thus form a guideway which retains the outer member 10 in proper longitudinal relationship with reference to the star-shaped hub. The plates 14 and 15 are grooved as at 16 and 18, to form retaining recesses in which rubber gaskets 19 and 20 may be seated. These gaskets form a water tight joint between the side plates 14 and 15 and the spoke carrying member 10, thus effectually preventing the entrance of water into the working parts of the hub, including the springs, etc., thereby preventing the hub from being clogged with sediment, or destroyed by rusting and consequent breaking of the springs.

The outer ends of the cylindrical side portions 3, 3 of the hub 1 are covered by reinforcing caps 21, 22, which have shoulder portions 23, 24, that are adapted to be seated against the side plates 14 and 15. Rivets, or bolts 25, are adapted to pass through the shoulder portions 23, 24, of the reinforcing caps 21, 22, through the side plates 14 and 15, and through the hub member 1, thus effectually and rigidly binding all of the stationary portions of the hub solidly together, and forming a construction which is very rigid and which is adapted to withstand hard and heavy usage.

Having thus described my invention what I desire to claim is:—

In a resilient wheel in combination, a hub member, pairs of parallel winged housings integral with said hub member, resilient springs carried between said parallel walls, a spoke carrying member surrounding said resilient hub, wedge shaped members on said spoke carrying member constructed to coöperate with V-shaped openings formed between the housings, side plates for retaining said hub member and said spoke carrying member in normal relationship, and means for retaining said side plates in position.

JOHN BERNER.

Witnesses:
THEODORE KARFER,
FRED W. POTTER.

Copies of this patent may be obtained for five cents each, by addressing the "Commissioner of Patents, Washington, D. C."